United States Patent
Johnston

(10) Patent No.: US 7,623,443 B2
(45) Date of Patent: Nov. 24, 2009

(54) TIME SPREAD MULTICARRIER BURST MAPS

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 11/189,482

(22) Filed: Jul. 26, 2005

(65) Prior Publication Data

US 2007/0025247 A1   Feb. 1, 2007

(51) Int. Cl.
*H04J 11/00* (2006.01)
(52) U.S. Cl. .................................. 370/208; 370/330
(58) Field of Classification Search .............. 370/203, 370/208, 431, 436, 330
See application file for complete search history.

(56) References Cited

U.S. PATENT DOCUMENTS

| | | | | |
|---|---|---|---|---|
| 6,567,387 | B1 * | 5/2003 | Dulin et al. | 370/329 |
| 7,299,048 | B2 * | 11/2007 | Lim et al. | 455/442 |
| 7,336,953 | B2 * | 2/2008 | Kim et al. | 455/438 |
| 2005/0107036 | A1 * | 5/2005 | Song et al. | 455/23 |
| 2005/0201269 | A1 * | 9/2005 | Shim et al. | 370/208 |
| 2006/0120392 | A1 * | 6/2006 | Ye et al. | 370/412 |

OTHER PUBLICATIONS

"Air Interface for Fixed Broadband Wireless Access Systems", *IEEE Std. 802*, (2004), 307-631.

* cited by examiner

*Primary Examiner*—Derrick W Ferris
*Assistant Examiner*—Jason Levelle
(74) *Attorney, Agent, or Firm*—The Law Offices of John C. Scott, LLC; John C. Scott

(57) ABSTRACT

In a multicarrier communication network, specific subcarriers are dedicated for use in carrying burst descriptor information. A subscriber station in the network may monitor the dedicated subcarriers to determine when a burst involving the station is to occur. By using dedicated subcarriers for burst information, scheduling decisions can be made closer in time to the actual bursts.

28 Claims, 6 Drawing Sheets

TIME SPREAD MULTICARRIER BURST MAPS

TECHNICAL FIELD

The invention relates generally to wireless communications and, more particularly, to techniques and structures for managing communication activity in a multicarrier wireless system.

BACKGROUND OF THE INVENTION

Multicarrier communication is a communication technique that utilizes a number of narrowband subcarriers to transmit information across a channel. Each subcarrier may be separately modulated with a data symbol before a composite signal including all of the modulated subcarriers is transmitted into the channel. One form of multicarrier communication that is growing in popularity is orthogonal frequency division multiplexing (OFDM). In an OFDM system, the subcarriers that are used to transmit information are each orthogonal to one another. A related form of multicarrier communication, known as orthogonal frequency division multiple access (OFDMA), also uses orthogonal subcarriers and, in addition, allows the subcarriers of transmitted signals to be allocated to different users in the system. OFDM, OFDMA, and other multicarrier techniques are being adopted by more and more wireless networking standards. There is a need for novel strategies for structuring communication activity in systems using these multicarrier technologies.

DETAILED DESCRIPTION

Figure 1:
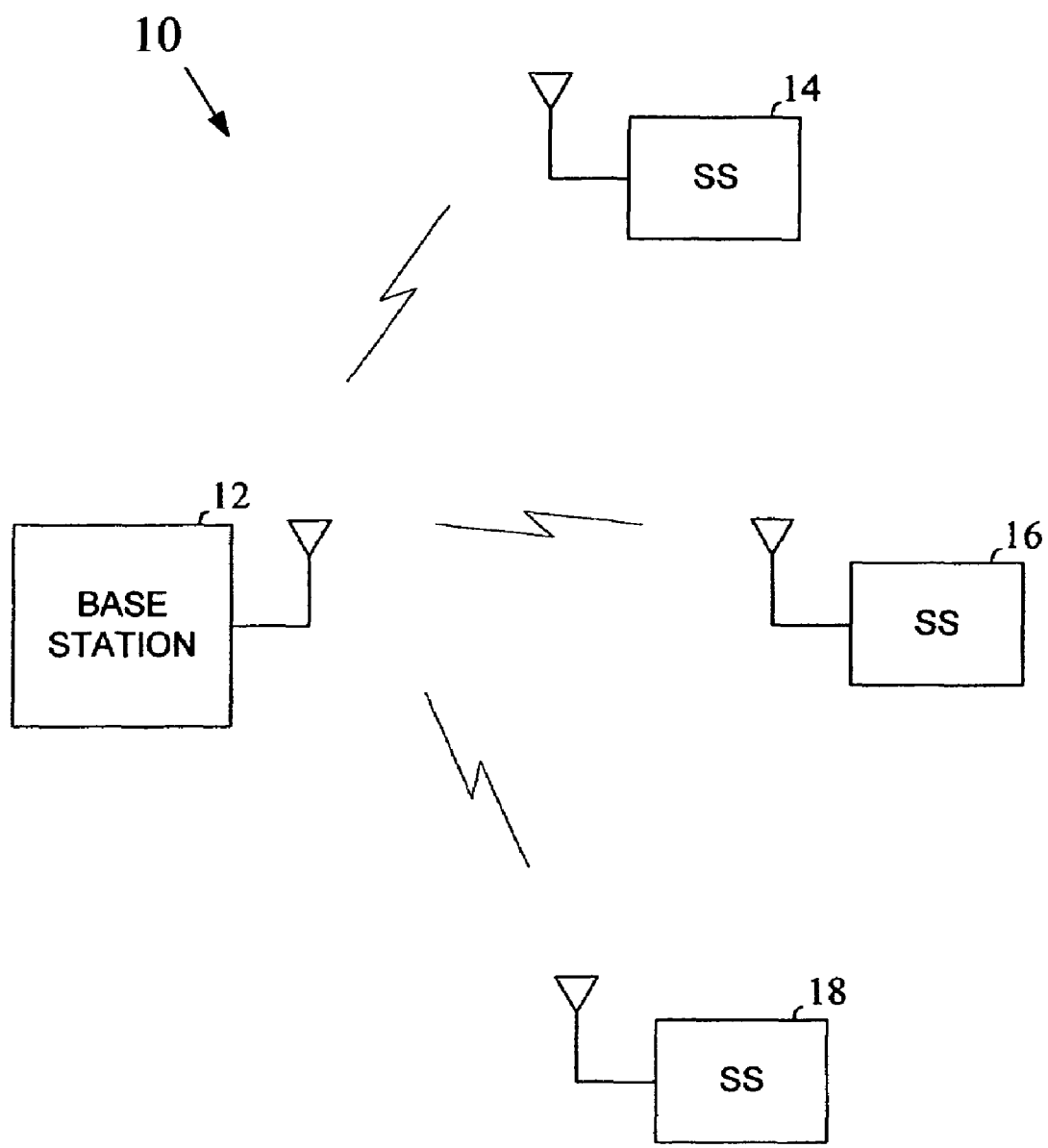
FIG. 1 is a diagram illustrating a multicarrier wireless network arrangement that may utilize features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating a multicarrier wireless network arrangement 10 that may utilize features of the present invention. As shown, a multicarrier wireless base station 12 is providing communication services for a number of multicarrier wireless subscriber stations 14, 16, 18 in a coverage region thereof. In the arrangement 10, communication from the base station 12 to the individual subscriber stations 14, 16, 18 is known as downlink communication and communication from the subscriber stations 14, 16, 18 to the base station 12 is known as uplink communication. Any number of subscriber stations may be associated with a base station at any particular time (up to a limit). In the multicarrier wireless network arrangement 10 of FIG. 1, data may be transmitted as multicarrier symbols (e.g., OFDM symbols). A multicarrier symbol is a signal that includes all of the subcarriers of the corresponding system with data modulated onto some or all of the subcarriers. In some networks, adaptive modulation may be used in which different modulation schemes may be used for different subcarriers.

The base station 12 and each of the subscriber stations 14, 16, 18 may include one or more antennas for use in transmitting and/or receiving multicarrier signals into/from a wireless channel. Any type of antennas may be used including, for example, dipoles, patches, helical antennas, microstrip antennas, antenna arrays, and/or others.

In the network arrangement 10 of FIG. 1, techniques need to be developed for organizing the flow of information between the base station 12 and the subscriber stations 14, 16, 18. In some multicarrier systems, a frame-based approach is used for organizing the flow of information. In a frame-based approach, the base station 12 may define a frame structure that is to be used by the base station 12 and the subscriber stations 14, 16, 18 to communicate with one another. Typically, the frame structure will be divided into a downlink subframe and an uplink subframe. Each of the subframes may be used to transmit one or more multicarrier symbols in the network. That is, within a downlink subframe, one or more multicarrier symbols may be transmitted from the base station 12 to one or more of the subscriber stations 14, 16, 18. Similarly, within an uplink subframe, one or more multicarrier symbols may be transmitted from the subscriber stations 14, 16, 18 to the base station 12. The base station 12 will allocate symbols within the downlink and the uplink subframes to each of the subscriber stations 14, 16, 18.

The frame structure developed by the base station 12 when a frame-based approach is being used may include mapping data at a beginning of the frame. The mapping data will typically include information that describes the structure of the frame. For example, the mapping data may include information identifying the symbol allocations for each subscriber station (in both the downlink subframe and the uplink subframe). The mapping data may also include other information, such as the modulation/coding schemes (MCSs) to be used by the various subscriber stations, etc. Each subscriber station within a network may read the mapping data at the beginning of a transmitted frame to determine where it will begin to receive data from the base station (within the downlink subframe) and where it may begin to transmit data to the base station (within the uplink subframe). In some systems, the multicarrier bandwidth may be divided between two or more subscriber stations. That is, some of the subcarriers within a multicarrier symbol may be allocated to one subscriber station while other subcarriers may be allocated to another subscriber station. In such systems, the mapping data may also include this bandwidth sharing information.

Figure 2:
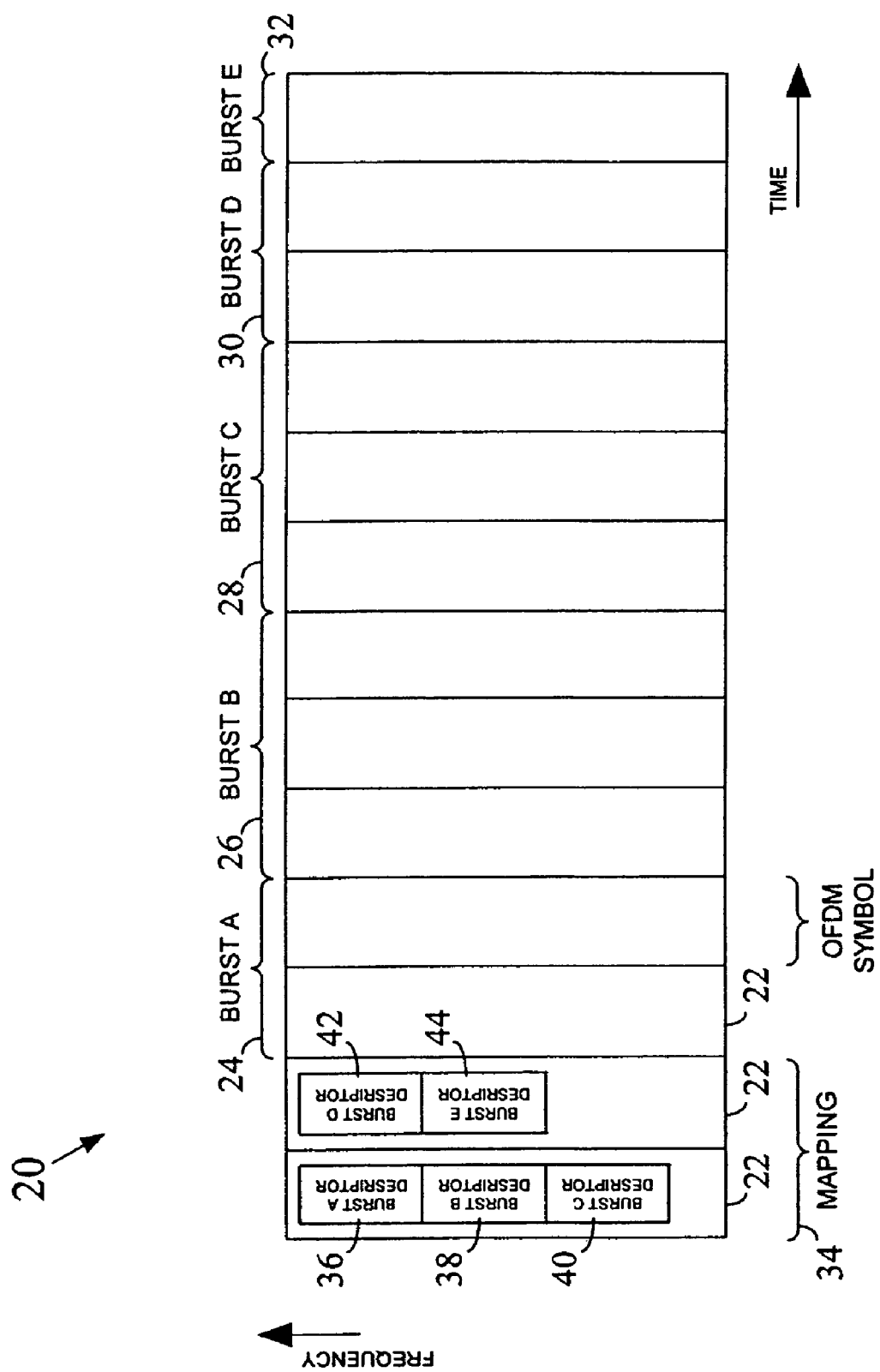
FIG. 2 is a diagram illustrating a downlink subframe that may be used within a multicarrier wireless network.

FIG. 2 is a diagram illustrating a downlink subframe 20 that may be used within a multicarrier wireless network using a frame-based approach. Although not shown, the downlink subframe 20 will typically be followed by an uplink subframe. As illustrated, the downlink subframe 20 is divided into a series of consecutive multicarrier symbols 22. In an OFDM system, for example, the multicarrier symbols 22 would be OFDM symbols. Data is transmitted from the base station to the individual subscriber stations within a series of downlink bursts 24, 26, 28, 30, 32. Each burst may include one or more consecutive symbols 22 that are allocated to a particular subscriber station. Before the bursts 24, 26, 28, 30, 32, the downlink subframe 20 may include one or more symbols 34 containing mapping data. The symbols containing mapping data 34 may include a number of burst descriptors 36, 38, 40, 42, 44 that each carry information about a corresponding one of the bursts 24, 26, 28, 30, 32. A burst descriptor may include, for example, the time at which the corresponding burst begins, the duration of the burst, the identity of the associated subscriber station, the MCS to be used, PDU structure information, and/or other burst related information. Although not shown, the downlink subframe 20 may also include other multicarrier symbols to provide, for example, a preamble to allow subscriber stations to synchronize to the base station, mapping data for the uplink subframe, and/or other information. The uplink subframe following the downlink subframe 20 may also include a number of bursts that correspond to the subscriber stations of the associated network.

A problem with the frame structure of FIG. 2 is that the burst allocation decisions and MCS decisions are made at the beginning of the subframe 20 and may not be modified thereafter. However, channel conditions may change during the frame and, consequently, decisions that appeared to be optimal when made at the beginning of the frame may later prove to be suboptimal at the time of actual transmission. To reduce the likelihood that significant channel changes will occur during the frame, the frame can be made as short as possible. However, this technique will increase the overall overhead percentage and thus reduce throughput in the network.

Figure 3:
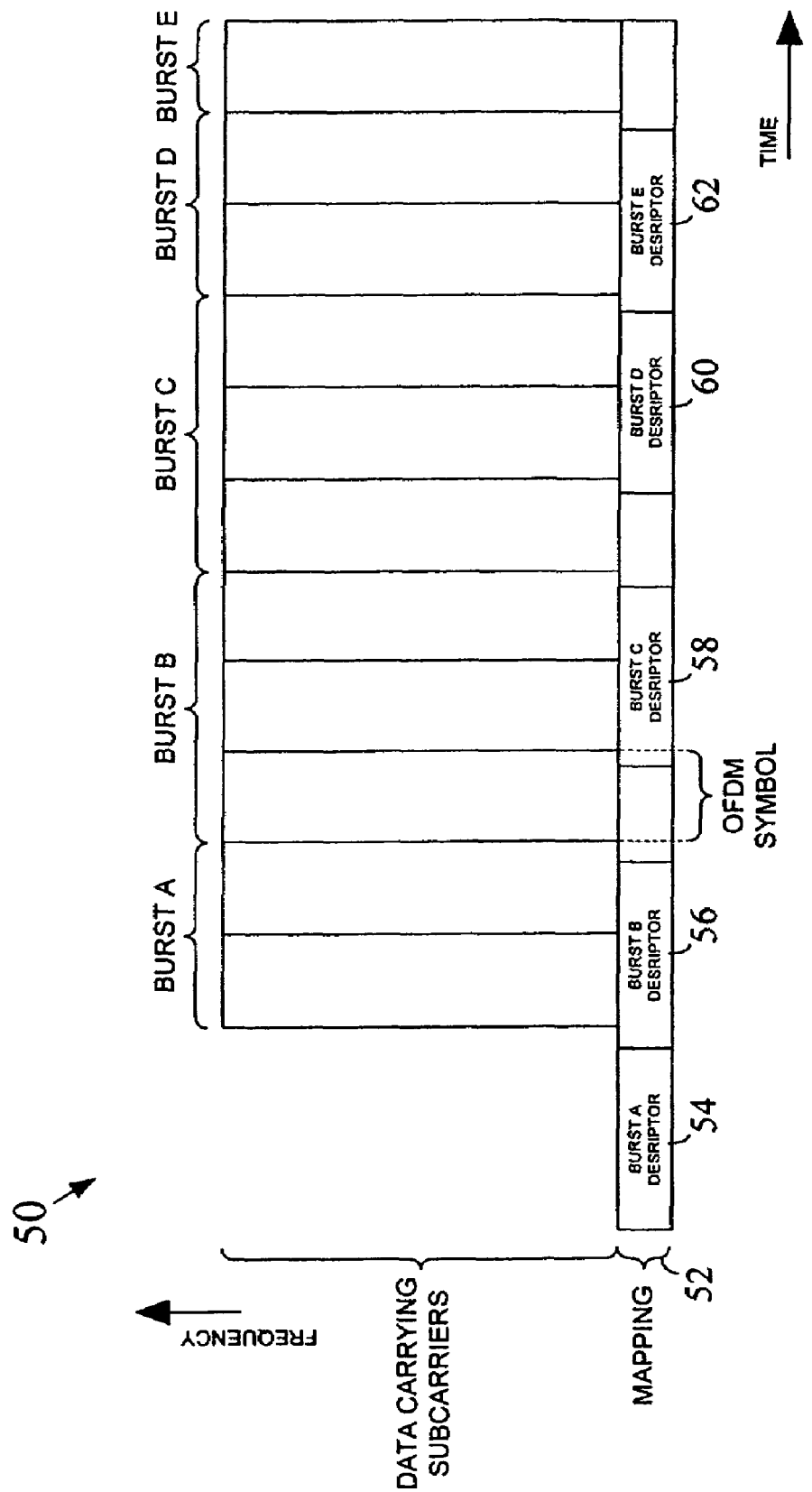
FIG. 3 is a diagram illustrating an arrangement for use in managing communication activity within a multicarrier wireless network in accordance with an embodiment of the present invention.

FIG. 3 is a diagram illustrating an arrangement 50 for use in managing communication activity within a multicarrier wireless network in accordance with an embodiment of the present invention. As shown, instead of including all mapping information at the beginning of a frame, mapping information may be transmitted throughout the communication between the base station and the subscriber stations within one or more dedicated subcarriers 52 of the network. Burst descriptors 54, 56, 58, 60, 62 may be transmitted using the dedicated subcarriers 52 at a time that is closer to the actual time of the corresponding burst than can be achieved using descriptors at the beginning of a frame. As before, the burst descriptors 54, 56, 58, 60, 62 may include information such as, for example, the time that a corresponding burst begins, the duration of the burst, the identity or address of the associated subscriber station, the MCS to be used, PDU structure, and/or other information. In at least one embodiment, the burst descriptors are transmitted a fixed amount of time before the associated bursts are to occur. In such an embodiment, the burst descriptors do not need to include information identifying the beginning of the associated burst.

In the frame-based scheme illustrated in FIG. 2, downlink and uplink communication was performed within separate dedicated subframes. Within the arrangement 50 of FIG. 3, on the other hand, uplink and downlink bursts may be interleaved much more finely. That is, each successive burst can be either a downlink burst or an uplink burst. In at least one embodiment, the burst descriptors 54, 56, 58, 60, 62 may include information identifying the type of burst that is about to occur (e.g., a downlink burst, an uplink burst, a burst between peer nodes in a mesh structured or ad hoc network, etc.). The arrangement 50 removes the frame boundaries from the communication structure, thus enabling a subsequent burst to be allocated on the basis of instantaneous need rather than an anticipated need determined sometime in the past. The arrangement 50 of FIG. 3 allows burst decisions to be made based upon more recent channel information than prior techniques allowed. That is, the decision to transmit a burst for a particular subscriber station, to allocate a specific number of symbols to a burst, and/or to use a particular MCS for a burst does not need to be made until slightly before the corresponding burst descriptor is transmitted.

In general, a burst descriptor corresponding to a burst may be transmitted a short time before the actual burst is to begin. In at least one embodiment, the transmitting station may chose, for each transmission, the period of time before the burst that the burst descriptor is to be transmitted to be as short as is needed to achieve efficient use of the channel. In other embodiments, a constant time period may be used. In one possible approach, the burst descriptors may be transmitted as part of the normal multicarrier symbols transmitted by the corresponding base station. In another approach, as illustrated in FIG. 3, the burst descriptors do not have to be transmitted in time alignment with the individual symbols. In addition, although the dedicated subcarriers are illustrated as being adjacent subcarriers that are grouped together, it should be appreciated that in some implementations the subcarriers dedicated to carrying mapping information may be in two or more discontinuous groups across the channel bandwidth. Any number of subcarriers (i.e., one or more) may be dedicated for use in carrying mapping information in accordance with the present invention. In practice, the number of subcarriers that are used will typically be less than 15% of the total number of subcarriers within the network bandwidth.

Figure 4:
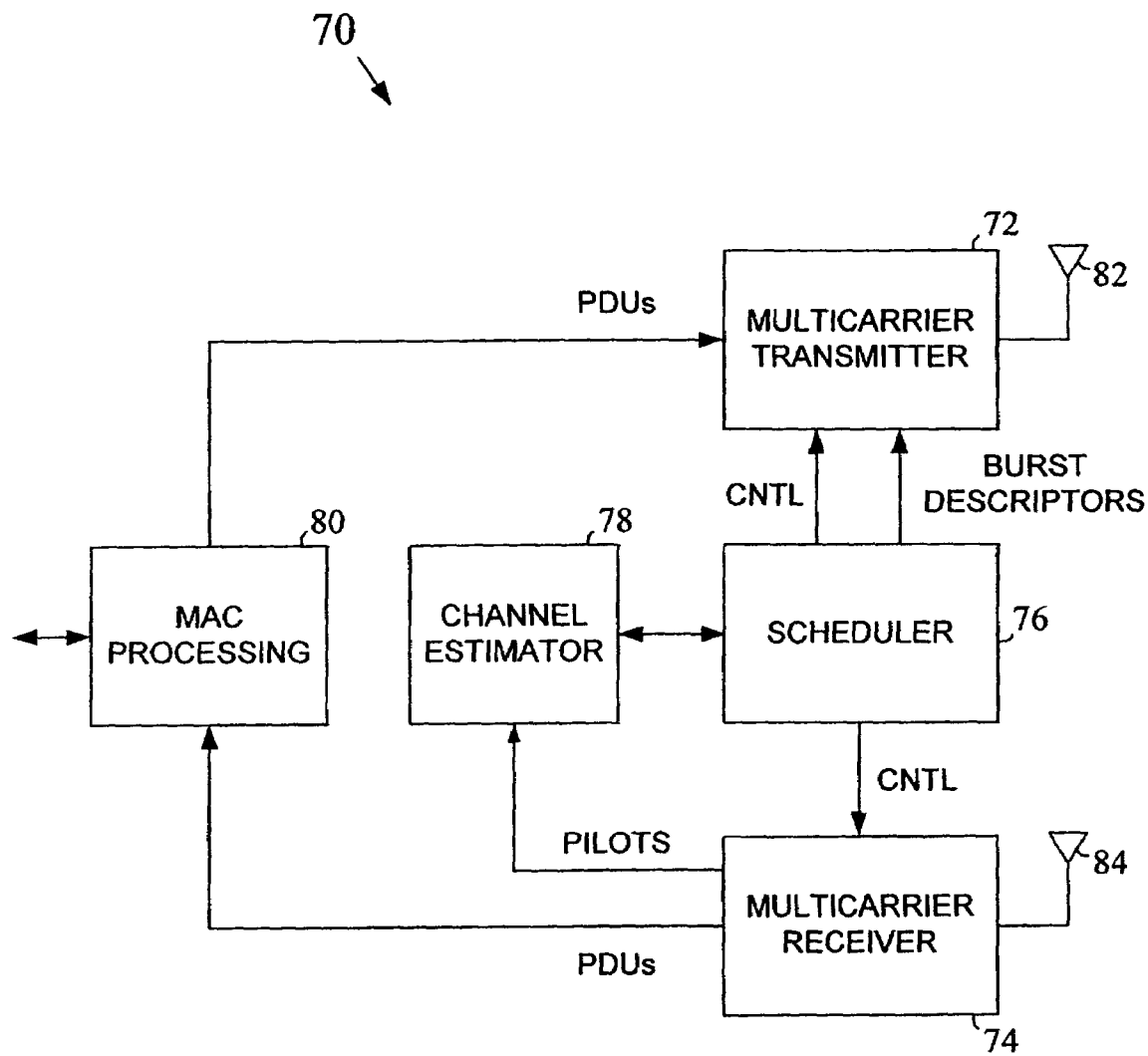
FIG. 4 is a block diagram illustrating an example of a base station architecture in accordance with an embodiment of the present invention.

FIG. 4 is a block diagram illustrating an example of a base station architecture 70 in accordance with an embodiment of the present invention. As shown, the base station architecture 70 may include one or more of: a multicarrier transmitter 72, a multicarrier receiver 74, a scheduler 76, a channel estimator 78, and a medium access control (MAC) processing subsystem 80. The multicarrier transmitter 72 is operative for generating multicarrier transmit signals for transmission to one or more remote subscriber stations. The multicarrier receiver 74 is operative for receiving multicarrier signals from one or more remote subscriber stations. The multicarrier transmitter 72 and the multicarrier receiver 74 may each be coupled to one or more corresponding antennas 82, 84 (or antenna sharing may be used). The multicarrier transmitter 72 may receive protocol data units (PDUS) from the MAC processing subsystem 80 to be incorporated into the multicarrier transmit signals. Likewise, the multicarrier receiver 74 may transfer PDUs to the MAC processing subsystem 80 that were extracted from multicarrier signals received from remote subscriber stations.

In at least one embodiment, the multicarrier transmitter 72 may include, among other things, constellation mapping functionality for mapping data into constellation points, pilot insertion functionality for inserting pilot tones into transmit signals, an inverse discrete Fourier transform (IDFT) unit to convert frequency domain samples to corresponding time domain samples, one or more serial-to-parallel and parallel-to-serial converters, a cyclic prefix insertion unit, and/or other elements commonly found within multicarrier (e.g., OFDM) transmitters. Similarly, the multicarrier receiver 74 may include, among other things, a cyclic prefix removal unit, one or more serial-to-parallel and parallel-to-serial converters, a discrete Fourier transform (DFT) unit to convert time domain samples to corresponding frequency domain samples, a demapper to demap complex signal points within the received signals, and/or other elements commonly found within multicarrier (e.g., OFDM) receivers.

The scheduler 76 is operative for managing the timing of the communication between the base station and the remote subscriber station(s). In at least one embodiment of the invention, the scheduler 76 will utilize a communication structure similar to that illustrated in FIG. 3. That is, the scheduler 76 will determine when individual subscriber stations being serviced by the base station will receive information from the base station (e.g., during downlink bursts) and when individual subscriber stations will be able to transmit information to the base station (e.g., during uplink bursts). The scheduler 76 will then cause burst descriptor information to be transmitted to the subscriber stations using dedicated subcarriers within the network bandwidth. In one possible approach, the burst descriptor information may be delivered from the scheduler 76 to the multicarrier transmitter 72 for incorporation into the multicarrier signals to be transmitted.

As described previously, a burst descriptor may be transmitted a short time before a corresponding burst is scheduled to occur. This allows the burst decision for each individual burst to be made much closer in time to the actual burst. In this manner, more recent information (e.g., channel information, traffic information, priority information, quality of service (QOS) information, etc.) may be considered in making each burst decision. The scheduler 76 may deliver control information to the multicarrier transmitter 72 and the multicarrier receiver 74 to instruct these entities when to transmit data to, or receive information from, each of the subscriber stations. During a transmit operation, the multicarrier transmitter 72 may be required to map input PDUs associated with a particular subscriber station into the corresponding burst defined by the scheduler 76. In a similar fashion, during a receive operation, the multicarrier receiver 74 may be required to demap PDUs associated with a particular subscriber station from a corresponding uplink burst.

In at least one embodiment, the scheduler 76 will be implemented as a separate unit that utilizes a combination of hardware and software to perform its functions in a relatively rapid fashion. Dedicated scheduling hardware and software that can rapidly compute optimum burst maps for the near future, as the current channel knowledge and data transmission requirements change will improve the performance of such as system.

As shown in FIG. 4, the base station architecture 70 may also include a channel estimator 78 for estimating the channel between the base station and each of the subscriber stations currently being serviced. In at least one embodiment, the channel estimator 78 will continually update the channel information for each wireless channel using pilot tones received from the corresponding subscriber stations. The updated channel information may be made available to the scheduler 76 for use in making the burst decisions during base station operation. The updated channel information may also be made available to the multicarrier receiver 74 and/or the multicarrier transmitter 72. Techniques for performing channel estimation are well known in the art.

Figure 5:
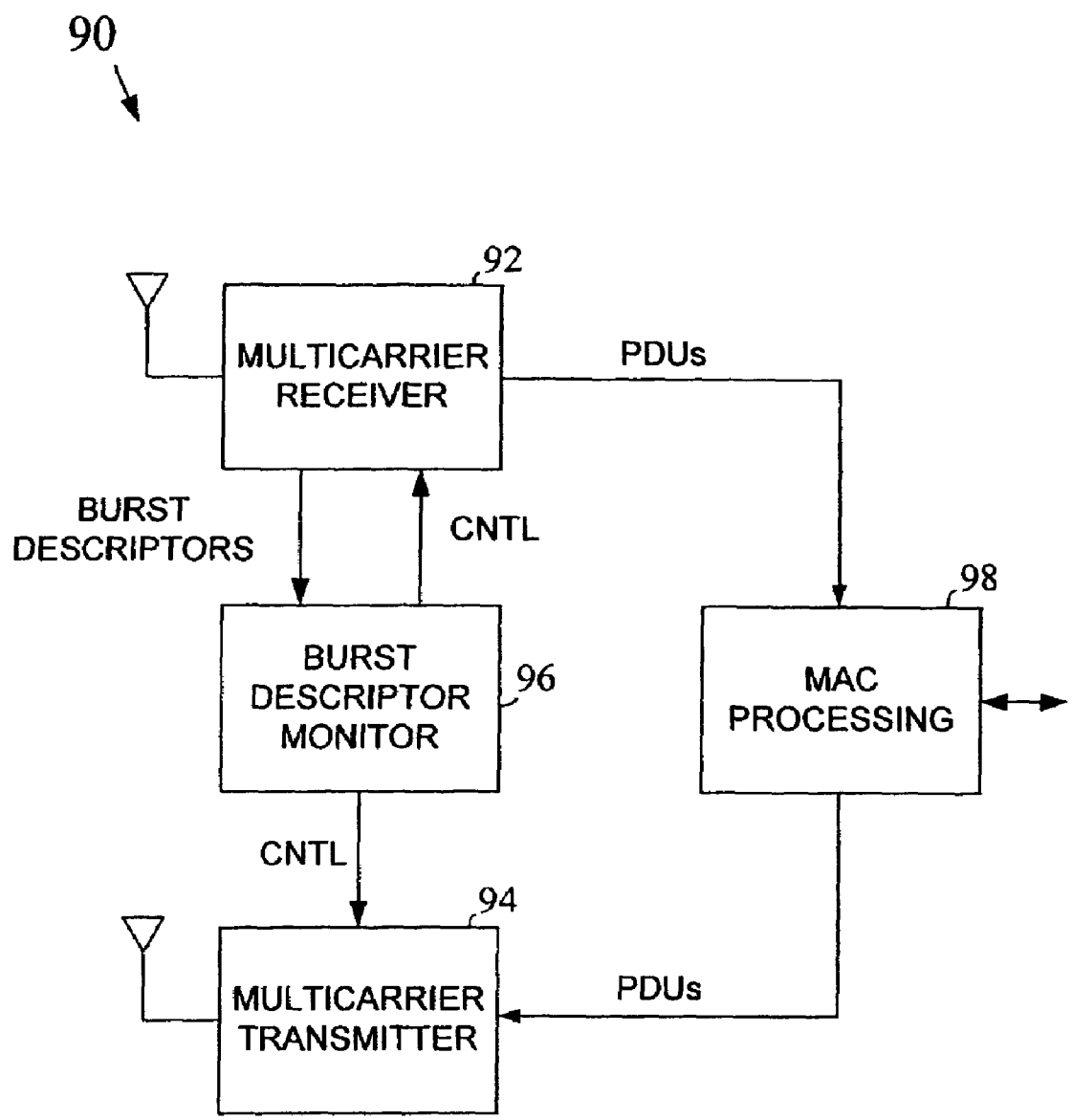
FIG. 5 is a block diagram illustrating an example of a subscriber station architecture in accordance with an embodiment of the present invention.

FIG. 5 is a block diagram illustrating an example subscriber station architecture 90 in accordance with an embodiment of the present invention. As shown, the subscriber station architecture 90 may include one or more of: a multicarrier receiver 92, a multicarrier transmitter 94, a burst descriptor monitor 96, and. a MAC processing subsystem 98. The multicarrier receiver 92 is operative for receiving multicarrier signals from a remote base station. Similarly, the multicarrier transmitter 94 is operative for generating multicarrier transmit signals for transmission to the remote base station. The multicarrier receiver 92 and the multicarrier transmitter 94 may include elements similar to those described previously in connection with the multicarrier receiver 74 and the multicarrier transmitter 72, respectively, of FIG. 4.

The burst descriptor monitor 96 monitors the dedicated subcarriers of the multicarrier receive signals for burst descriptors. When a burst descriptor is detected, the burst descriptor monitor 96 may first determine whether the burst descriptor is intended for the associated subscriber device. If it is, the burst descriptor monitor 96 may next determine what type of burst the burst descriptor is describing. For example, in at least one embodiment, the burst descriptor may be describing either a downlink burst or an uplink burst. The burst descriptor monitor 96 may also determine the timing of the upcoming burst from the burst descriptor. Using the information from the burst descriptor, the burst descriptor monitor 96 may then ready the subscriber station for the upcoming burst. For example, a received burst descriptor may indicate that a downlink burst involving the subscriber station is to begin at a particular time and last for a particular duration, that 16-quadrature amplitude modulation (16 QAM) is to be used for the burst, and that the PDUs are to have a particular structure. The burst descriptor monitor 96 may then cause the multicarrier receiver 92 within the subscriber station to prepare for the incoming burst. The PDUs extracted during the downlink burst may then be delivered to the MAC processing subsystem 98 for further processing. In another example, a received burst descriptor may indicate that an uplink burst involving the subscriber station is to begin at a particular time and last for a particular duration, that quadrature phase shift keying (QPSK) modulation is to be used, and that the PDUs are to have a particular structure. The burst descriptor monitor 96 may then cause the corresponding multicarrier transmitter 94 to prepare for transmission of the upcoming burst. During the burst, PDUs received from the MAC processing subsystem 98 may be mapped into corresponding symbols within the burst for transmission to the remote base station.

Figure 6:
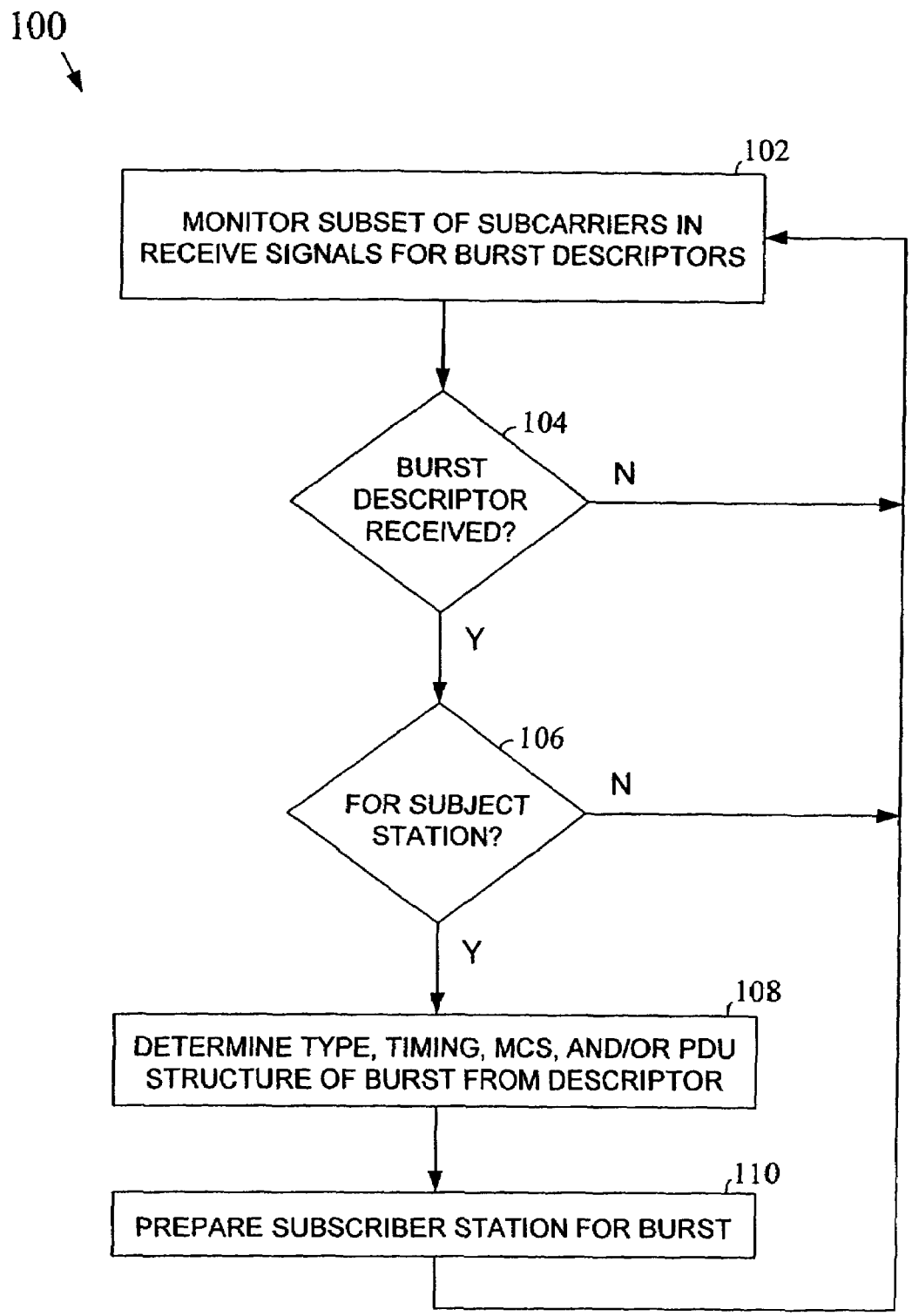
FIG. 6 is a flowchart illustrating an example method for use within a subscriber station in a multicarrier network in accordance with an embodiment of the present invention.

FIG. 6 is a flowchart illustrating an example method 100 for use within a subscriber station in a multicarrier network in accordance with an embodiment of the present invention. A subset of subcarriers within a receive bandwidth of the subscriber station is monitored for burst descriptors (blocks 102 and 104). When a burst descriptor is detected, it may then be determined whether the burst descriptor is for the associated subscriber station (block 106). If not, the monitoring is resumed. If the burst descriptor is for the subscriber station, the type of burst (e.g., uplink or downlink), the timing of the burst, the MCS of the burst, and/or the PDU structure to be used for the burst may next be determined from the descriptor (block 108). The subscriber station is next prepared for the burst and the burst is processed at the appropriate time (block 110). If the burst is a downlink burst, preparation for the burst may include configuring a multicarrier receiver of the subscriber station to receive the burst at the indicated time. If the burst is an uplink burst, preparation for the burst may include configuring a multicarrier transmitter of the subscriber station to transmit the burst at the indicated time. After the burst has ended, the monitoring of the dedicated subcarriers may resume (block 102).

The techniques and structures of the present invention may be implemented in any network or system using multicarrier communications in an infrastructure type configuration including, for example, point to point, point to multipoint, ad hoc or mesh networks using orthogonal frequency division multiplexing (OFDM), point to point, point to multipoint, ad hoc or mesh networks using orthogonal frequency division multiple access (OFDMA), and/or others.

The inventive techniques and structures may be implemented in any of a variety of different forms. For example, features of the invention may be embodied within personal digital assistants (PDAs) having wireless capability; laptop, palmtop, desktop, tablet, and other computers having wireless capability; cellular telephones and other handheld wireless communicators; pagers; satellite communicators; audio/video/multimedia devices having wireless capability; network interface cards (NICs) and other network interface structures; wireless access points; wireless base stations; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A machine implemented method comprising:
monitoring, at a first wireless subscriber station, a subset of subcarriers within a series of multicarrier symbols for burst descriptors, said subset of subcarriers being dedicated for transmission by a remote base station of burst descriptor information, wherein said series of multicarrier symbols are allocated to carry data communication between said remote base station and a plurality of wireless subscriber stations and said subset of subcarriers that are dedicated for transmission of burst descriptor information extends across said series of multicarrier symbols in time, wherein no other information is permitted to be transmitted within said subset of subcarriers but burst descriptor information; and when a burst descriptor is detected that is directed to said first wireless subscriber station:
reading said burst descriptor to determine a type of burst that is scheduled to occur and a time said burst is scheduled to occur; and
preparing said first wireless subscriber station to process said burst.

2. The method of claim 1, wherein:
said type of burst is one of: a downlink burst, an uplink burst, and a burst between peer nodes.

3. The method of claim 1, further comprising:
reading said burst descriptor to determine a modulation coding scheme to be used during said burst, wherein preparing said first wireless subscriber station to process said burst includes preparing said first wireless subscriber station to use said modulation coding scheme.

4. The method of claim 1, further comprising:
reading said burst descriptor to determine a protocol data unit (PDU) structure to be used during said burst, wherein preparing said first wireless subscriber station to process said burst includes preparing said first wireless subscriber station to process PDUs having said PDU structure.

5. The method of claim 1, wherein:
preparing first wireless subscriber station to process said burst includes configuring a multicarrier receiver of said first wireless subscriber station when said burst is a downlink data burst.

6. The method of claim 1, wherein:
preparing said first wireless subscriber station to process said burst includes configuring a multicarrier transmitter of said first wireless subscriber station when said burst is an uplink data burst.

7. The method of claim 1, wherein:
said burst descriptor is transmitted by said remote base station a short time period before said burst is scheduled to occur.

8. The method of claim 7, wherein:
said short time period has a length that is chosen by the remote base station to be as short as is needed to achieve efficient use of the channel.

9. An apparatus comprising:
a multicarrier transceiver to support wireless communication between said apparatus and a remote wireless base station within a series of multicarrier symbols; and
a burst descriptor monitor to monitor predetermined subcarriers within said series of multicarrier symbols to detect burst descriptors carried by said predetermined subcarriers that are directed to said apparatus, said burst descriptors having been transmitted by said remote wireless base station and each burst descriptor to describe a burst that is to occur shortly after detection of said burst descriptor, wherein said predetermined subcarriers are dedicated for use by said remote wireless base station to transmit burst descriptors and extend across said series of multicarrier symbols in time, wherein no other information is permitted to be transmitted within said predetermined subcarriers but burst descriptors.

10. The apparatus of claim 9, wherein:
said burst descriptor monitor is to determine a type of burst that is about to occur when a burst descriptor is detected that is directed to said apparatus, wherein said type of burst is identified within said burst descriptor.

11. The apparatus of claim 10, wherein:
said type of burst is one of: a downlink burst, an uplink burst, and a burst between peer nodes.

12. The apparatus of claim 9, wherein:
said burst descriptor monitor is to determine a time that a corresponding burst is scheduled to begin when a burst descriptor is detected that is directed to said apparatus, wherein said time is identified within said burst descriptor.

13. The apparatus of claim 9, wherein:
said burst descriptor monitor is to determine a modulation coding scheme (MCS) that is to be used during a corresponding burst when a burst descriptor is detected that is directed to said apparatus, wherein said MCS is identified within said burst descriptor.

14. The apparatus of claim 9, wherein:
said burst descriptor monitor is to determine a protocol data unit (PDU) structure that is to be used during a corresponding burst when a burst descriptor is detected that is directed to said apparatus, wherein said PDU structure is identified within said burst descriptor.

15. The apparatus of claim 9, wherein:
said burst descriptor monitor is to configure said multicarrier transceiver based on information within a detected burst descriptor when a downlink burst is scheduled to occur.

16. An apparatus for use in a multicarrier base station, comprising:
a multicarrier transceiver to support wireless communication between said multicarrier base station and one or more remote subscriber stations within a coverage region of said multicarrier base station in a series of multicarrier symbols; and
a scheduler to schedule multicarrier communications between said multicarrier base station and said one or more remote subscriber stations within said series of multicarrier symbols, said scheduler to deliver burst descriptors to said multicarrier transceiver to be transmitted, using dedicated subcarriers, to corresponding remote subscriber stations, said burst descriptors to each describe a corresponding burst that is scheduled to occur a short time after transmission of said burst descriptor, wherein said dedicated subcarriers that are dedicated for transmission of burst descriptors extend across said series of multicarrier symbols in time, wherein no other information is permitted to be transmitted within said dedicated subcarriers but burst descriptors.

17. The apparatus of claim 16, further comprising:
a channel estimator to generate a channel estimate for a wireless channel between the base station and each of the one or more remote subscriber stations, wherein said scheduler is to use said channel estimates to generate said burst descriptors for delivery to said multicarrier transceiver.

18. The apparatus of claim 17, wherein:
said channel estimator is to continuously update said channel estimates based on received pilot signals.

19. The apparatus of claim 16, wherein:
said scheduler is to instruct said multicarrier transceiver when to transmit a downlink burst to a particular remote subscriber station.

20. The apparatus of claim 16, wherein:
said burst descriptors each include an indication of a type of burst that is scheduled to occur.

21. The apparatus of claim 20, wherein:
said type of burst is one of: an uplink burst, a downlink burst, and a burst between peer nodes.

22. A system comprising:
at least one dipole antenna;
a multicarrier transceiver, coupled to said at least one dipole antenna, to support wireless communication between said apparatus and a remote wireless base station within a series of multicarrier symbols; and
a burst descriptor monitor to monitor predetermined subcarriers within said series of multicarrier symbols to detect burst descriptors carried by said predetermined subcarriers that are directed to said system, said burst descriptors having been transmitted by said remote wireless base station and each burst descriptor to describe a burst that is to occur shortly after detection of said burst descriptor, wherein said subset of subcarriers is dedicated for use by said remote wireless base station to transmit burst descriptors and extends across said series of multicarrier symbols in time, wherein no other information is permitted to be transmitted within said predetermined subcarriers but burst descriptors.

23. The system of claim 22, wherein:
said burst descriptor monitor is to determine a type of burst that is about to occur when a burst descriptor is detected that is directed to said system, wherein said type of burst is identified within said burst descriptor.

24. The system of claim 22, wherein:
said type of burst is one of: a downlink burst, an uplink burst, and a burst between peer nodes.

25. An article comprising a computer readable storage medium having instructions stored thereon that, when executed by a computing platform, operate to:
monitor, at a first wireless subscriber station, a subset of subcarriers within a series of multicarrier symbols for burst descriptors, said subset of subcarriers being dedicated for transmission by a remote base station of burst descriptor information, wherein said series of multicarrier symbols are allocated to carry data communication between said remote base station and a plurality of wireless subscriber stations and said subset of subcarriers that are dedicated for transmission of burst descriptor information extends across said series of multicarrier symbols in time, wherein no other information is permitted to be transmitted within said subset of subcarriers but burst descriptor information; and
when a burst descriptor is detected that is directed to said first wireless subscriber station:
read said burst descriptor to determine a type of burst that is scheduled to occur and a time said burst is scheduled to occur; and
prepare said first wireless subscriber station to process said burst.

26. The article of claim 25, wherein:
said type of burst is one of: a downlink burst, an uplink burst, and a burst between peer nodes.

27. The article of claim 25, wherein:
operation to prepare said first wireless subscriber station to process said burst includes operation to configure a multicarrier receiver of said first wireless subscriber station when said burst is a downlink burst.

28. The article of claim 25, wherein:
operation to prepare said first wireless subscriber station to process said burst includes operation to configure a multicarrier transmitter of said first wireless subscriber station when said burst is an uplink data burst.

* * * * *

UNITED STATES PATENT AND TRADEMARK OFFICE
CERTIFICATE OF CORRECTION

PATENT NO.       : 7,623,443 B2                               Page 1 of 1
APPLICATION NO. : 11/189482
DATED            : November 24, 2009
INVENTOR(S)      : David Johnston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Twenty-sixth Day of October, 2010

David J. Kappos
*Director of the United States Patent and Trademark Office*